United States Patent [19]

Nudd

[11] 4,369,856

[45] Jan. 25, 1983

[54] BACKHOE CONTROL WITH HAND THROTTLE AND ELECTRIC THROTTLE CONTROL

[75] Inventor: Barry C. Nudd, Burlington, Iowa

[73] Assignee: J. I. Case Company, Racine, Wis.

[21] Appl. No.: 191,751

[22] Filed: Sep. 29, 1980

[51] Int. Cl.³ .............................................. B60K 26/00
[52] U.S. Cl. ........................................ 180/321; 74/479
[58] Field of Search .............. 180/315, 321, 324, 322, 180/331; 74/479, 481, 482

[56] References Cited

U.S. PATENT DOCUMENTS

| | | | |
|---|---|---|---|
| 2,761,569 | 9/1956 | Iserman | 180/324 |
| 2,916,880 | 12/1959 | Hann | 180/315 |
| 3,452,829 | 7/1969 | Smith | 180/331 |
| 3,960,030 | 6/1976 | Williams | 180/315 |

FOREIGN PATENT DOCUMENTS

| | | | |
|---|---|---|---|
| 29822 | 12/1958 | Finland | 74/482 |
| 52-15022 | 2/1977 | Japan | 180/315 |
| 52-39287 | 3/1977 | Japan | 180/322 |

Primary Examiner—Joseph F. Peters, Jr.
Assistant Examiner—Ross Weaver
Attorney, Agent, or Firm—Dressler, Goldsmith, Shore, Sutker & Milnamow, Ltd.

[57] ABSTRACT

A vehicle such as a tractor having a rear mounted backhoe is provided with a mechanism for adjusting the speed of the engine to control the flow of fluid in the hydraulic control system. In addition to a conventional hand throttle, the mechanism for adjusting the engine speed includes an electric solenoid that can be actuated by a switch to increase the speed of the engine beyond the speed at which the hand throttle is set, and preferably to full throttle. This enables the operator of the vehicle to use the backhoe at an intermediate engine speed to perform backhoe functions that do not require maximum engine speed. By actuating a switch, the operator can quickly and easily increase the engine speed to full throttle to perform backhoe functions that require maximum engine speed.

9 Claims, 2 Drawing Figures

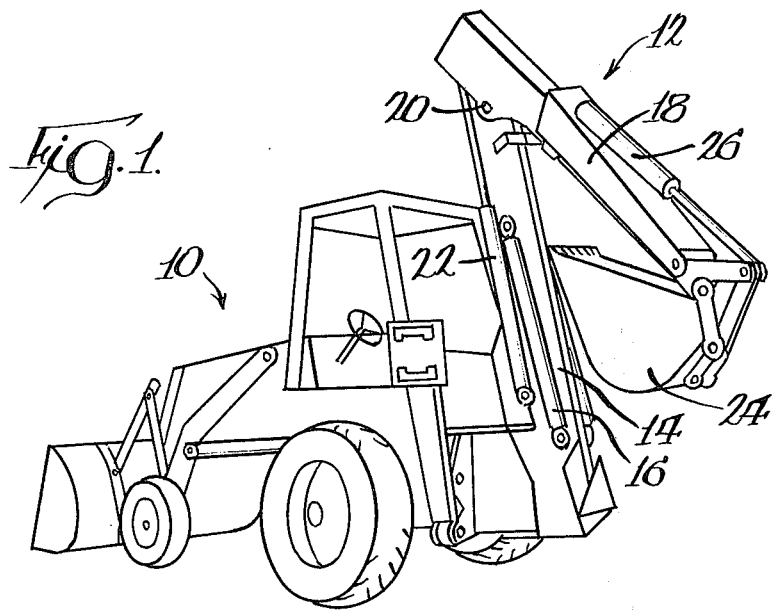
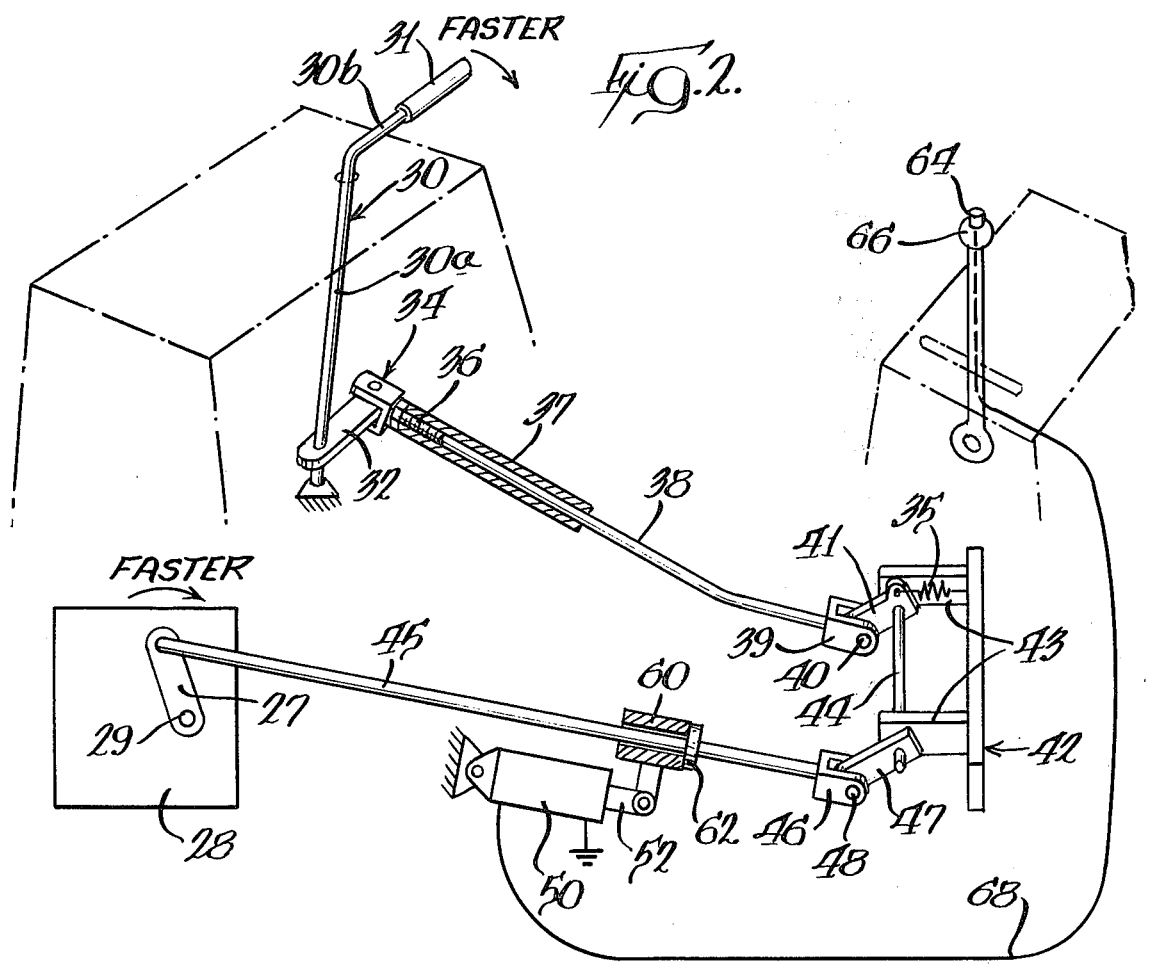

BACKHOE CONTROL WITH HAND THROTTLE AND ELECTRIC THROTTLE CONTROL

BACKGROUND OF THE INVENTION

1. Field of the Invention

The present invention relates generally to backhoes and more particularly to a mechanism for controlling the engine speed for the operation of a rear mounted backhoe on a vehicle such as a tractor.

2. Background of the Invention

Conventional rear mounted backhoes on vehicles such as tractors are operated through means of a hydraulic control valve with a hand lever that directs the flow of oil to a working cylinder. During the operation of all known conventional backhoes, the engine throttle is in a fixed position, generally with a control that is located on the steering wheel column. The engine throttle is used by reaching back from the backhoe operator station and adjusting the throttle at the desired setting.

Conventional hand throttles are disadvantageous in that an operator must take his eyes off of the backhoe when viewing the hand throttle to adjust its setting. The conventional hand throttles do not permit an operator to change the engine speed without moving a foot to a foot pedal or taking a hand off of one of the backhoe hydraulic control levers.

SUMMARY OF THE INVENTION

The foregoing disadvantages of the prior art are overcome in accordance with the present invention in which an electrical switch mounted on one of the backhoe control levers can be used in addition to a hand throttle for increasing the engine speed beyond a predetermined intermediate speed for use with a rear mounted backhoe. This enables the operator to quickly and easily increase the speed of the engine by activating a switch, without taking his eyes off of the backhoe, and without taking his hand off of the backhoe hydraulic control lever. The engine speed can be reduced back to the intermediate setting by deactivating the switch.

More particularly, the present invention comprises means for adjusting the speed of the engine in a vehicle such as a tractor to control the flow of fluid in the hydraulic control system. The engine speed adjusting means comprises an axially extending plunger having one end operatively connected to the engine for controlling the speed of the engine. Movement of the plunger in one direction increases the engine speed and movement in the opposite direction decreases the engine speed. Stop means is positioned on the plunger.

A lever has one end operatively connected to the other end of the plunger and an opposite end engageable by the hand of an operator of the vehicle. The lever is movable between a first position in which the plunger is in a first position and the engine speed is relatively slow, and a second position in which the plunger is in a second position and the engine speed is relatively fast.

An engagement member is positioned adjacent to the plunger and movable in the direction of the axis of the plunger. The engagement member is adapted to abut the stop member and move the stop member and the plunger along the axis of the plunger.

A piston member is supported by the vehicle frame and has one end operatively connected to the engagement member. The piston member is movable between a retracted position and an extended position.

Means is provided for actuating the piston member to move the piston member from the retracted position to the extended position, and for deactivating the piston member to move the piston member from the extended position to the retracted position.

An operator can thereby move the lever to an intermediate position between the first position and the second position, which moves the plunger to an intermediate position corresponding to an intermediate engine speed. The operator can increase the speed of the engine to a speed greater than the intermediate speed by actuating the piston member which moves the engagement member into engagement with the stop means, and moves the plunger towards the second position. The operator can decrease the speed of the engine to the intermediate speed by deactivating the piston member. The operator can further decrease the speed of the engine by moving the lever from the intermediate position towards the first position.

BRIEF DESCRIPTION OF THE DRAWING

FIG. 1 is a perspective view of a tractor which is capable of having the present invention incorporated therein; and FIG. 2 shows schematically a hand throttle and a backhoe control lever having a switch for controlling the engine speed of the vehicle.

DESCRIPTION OF THE PREFERRED EMBODIMENT

While this invention is susceptible of embodiment in many different forms, there is shown in the drawing and will herein be described in detail one specific embodiment, with the understanding that the present disclosure is to be considered as an exemplification of the principles of the invention and is not intended to limit the invention to the embodiment illustrated.

Referring to FIG. 1 of the drawing, a vehicle such as a tractor 10 has a backhoe unit 12 pivotally mounted on the rear of the tractor. More specifically, the backhoe unit consists of an articulated boom that is pivotally supported about a horizontal pivot axis on a swing tower (not shown) which in turn is pivoted about a vertical pivot. The specific form of the backhoe unit forms no part of the present invention; however, for purposes of completeness, the backhoe unit may be of the type disclosed in U.S. Pat. No. 3,376,984, issued to Elton B. Long, assigned to the assignee of the present invention, and incorporated herein by reference.

Briefly, the backhoe unit has a rigid boom section 14 that is pivoted about a horizontal pivot by means of a fluid ram 16. The outer end of the boom section 14 has a dipper stick assembly 18 pivoted about a horizontal pivot 20 and this pivotal movement is accomplished through a second fluid ram 22. The outer end of the dipper stick assembly 18 incorporates a bucket 24 that is again pivotally supported about a horizontal pivot and is moved by a fluid ram 26.

The movements of the backhoe unit are made possible by means of a hydraulic control system that is powered by the engine 28 of the tractor. The power from the tractor engine 28 that is available for the hydraulic system is determined by means of operating a hand lever or throttle 30 that is located on the steering wheel column in the forward portion of the cab and is used by the operator of the tractor by reaching back from the backhoe operator station and adjusting the hand throttle to the desired setting.

As shown in FIG. 2, the hand throttle 30 is a generally L-shaped rod that has a vertical leg 30a and a generally horizontal leg 30b that is joined to the top end of the vertical leg. The hand throttle 30 is rotatable. A handle 31 is secured to the free end of the horizontal leg 30b. The bottom end of the vertical leg 30a is secured to the vehicle frame and is rotatable.

An elongated flange 32 is secured to the bottom end of the vertical leg 30a. The flange 32 extends generally parallel to the handle 32 and the horizontal leg 30b of the hand throttle, so that rotation of the hand throttle 30 causes a corresponding rotation of the flange 32 about the vertical axis of the leg 30a. The handle 31 is graspable by the operator of the tractor to vary the speed of the tractor engine, as described hereinbelow.

The flange 32 is received between the legs of a yoke 34 and is secured thereto by a pin. The yoke 34 has a stem 36 that is received in a hollow tube 37 (illustrated in cross section), and is secured to the tube, as by means of threads. The end of the stem 36 is spaced from the end of the hollow tube which is open ended.

A rod 38 has one end that is slidably receivable in the hollow tube 37. The opposite end of the rod 38 is secured to yoke 39. A generally rectangular plate 41 is secured to the yoke 39 by means of a pin 40. The plate 41 is pivotal about the pin 40.

A bracket 42 is supported by the vehicle frame and includes a plurality of flanges 43 extending perpendicularly to the bracket. Each of the flanges 43 defines an aperture through which an elongated rod 44 is received, the rod 44 being rotatable within the apertures in the flanges 43. The rod 44 also extends through an opening defined by the plate 41, with the plate 41 being fixedly secured to the rod 44.

The axis of the rod 38 extends below the rod 44 in the illustrated embodiment.

An extension spring 35 has one end secured to the bracket 42 and an opposite end secured to the plate 41 at a location generally above the aperture through which the rod 44 extends. The axis of the spring 35 is above the rod 44. As the rod 44 and plate 41 rotate counterclockwise, the spring 35 extends further and the tension in the spring increases.

The engine 28 includes a fuel pump throttle lever 27 that is pivotal about a pin 29. The idle position is shown in FIG. 2. The fuel pump throttle lever 27 is pivotal to the right for increasing the engine speed.

The fuel pump throttle lever 27 is pivoted by an axially extending plunger 45 that has one end secured to the free end of the fuel pump throttle lever 27 for controlling the speed of the engine in a conventional manner. Movement of the plunger 45 in one direction (to the right in FIG. 2) increases the engine speed, following which movement of the plunger 45 in the opposite direction (to the left in FIG. 2) will decrease the engine speed.

The other end of the plunger 45 is secured to a yoke 46. A second rectangular plate 47 defines a pair of openings spaced apart along the length of the plate. The plate 47 is secured to the yoke 46 by means of a pin 48. The plate 47 is pivotal about the pin 48. The rod 44 extends through the other opening defined by the plate 47, with the plate 47 being fixedly secured to the rod 44. The axis of the plunger 45 extends below the rod 44 in the illustrated embodiment.

The hand throttle 30 is used to adjust the engine speed. In FIG. 2, the hand throttle 30 is shown in the idle position, and the fuel pump throttle lever 27 is correspondingly in the position wherein the engine is idling.

To increase the engine speed, the vehicle operator can rotate the hand throttle 31 clockwise, whereupon the stem 36 which is in engagement with the end of the rod 38 will move the rod 38 and the yoke 39 to the right. Since the axis of rod 38 extends below rod 44, the movement of the rod 38 and yoke 39 to the right causes the plate 41 to rotate counterclockwise, whereupon the rod 44 also rotates counterclockwise.

Since plate 47 is also secured to the rod 44, the plate 47 will also pivot counterclockwise. This causes the yoke 46 and hence the plunger 45 to move to the right. The fuel pump throttle lever 27 is thereby pivoted to the right, which increases the speed of the engine 28 in the vehicle.

As the hand throttle 31 is rotated clockwise further, the fuel pump throttle lever 27 is moved further to the right and the engine speed continues to increase correspondingly.

In accordance with the present invention, means is provided for quickly changing the engine speed from an intermediate speed to a full throttle speed without moving the hand throttle 30 from the intermediate setting. The hand throttle 30 faces the front, or loader, side of the tractor, whereas the means for increasing the engine speed to full throttle is provided in the side of the tractor cab that faces the backhoe. The operator of the tractor can thereby obtain a full throttle speed quickly and easily for those backhoe functions requiring maximum engine speed, without having to reach back to the hand throttle 30.

The means for increasing the engine speed to full throttle is shown schematically in FIG. 2. An electrical solenoid 50 having an extendable piston rod 52 is mounted to the vehicle frame. The piston rod 52 extends generally parallel to the plunger 45. The piston rod 52 is shown in the retracted position in FIG. 2. When the solenoid 50 is actuated, the piston rod 52 extends to the right.

The solenoid 50 includes a spring element (not shown) and a metallic member (not shown) that is secured to the piston rod 52. When the solenoid is actuated, the metallic member moves to the right as a result of the electro-magnetic field that is created within the solenoid, and the spring element becomes compressed. As the metallic member moves to the right, so does the piston rod 52.

When the solenoid is deactivated, there is no longer any electro-magnetic field within the solenoid, and no force to counteract the bias of the compressed spring acting against the magnetic member. The spring element therefore moves the magnetic member, and the piston rod 52, to the left to the fully retracted position shown in FIG. 2.

An engagement member such as a sliding collar 60 is secured to the piston rod 52 and defines an aperture. The plunger 45 is received through the aperture in the collar 60 and the plunger is axially movable relative to the sliding collar. A stop collar 62 is secured to the plunger 45, and is positioned between the sliding collar 60 and the yoke 46.

When the hand throttle is in the idle condition, shown in FIG. 2, the stop collar 62 abuts the sliding collar 60. As the engine speed is increased by turning the hand throttle 30 clockwise, the rod 44 rotates counterclockwise. The plate 47 is likewise rotated counterclockwise since it is secured to the rod 44, and thereby moves the plunger 45 to the right, and the stop collar 62 moves to the right away from the sliding collar 60 which remains stationary.

The solenoid 50 is actuated by an electrical switch 64 that is preferably mounted on one of the backhoe control hand levers 66 positioned in the rear position of the tractor cab and facing the backhoe. An electric wire 68 connects the solenoid 50 and the switch 64.

The switch 64 comprises a normally open momentary contact switch that is raised to the extended position shown in FIG. 2. By using just a thumb, the operator can depress the switch 64 to move it to a retracted position, thereby completing an electric circuit so that an electric signal can be sent to the solenoid 50 through electric wire 68 to actuate the solenoid. When the switch 64 is extended, the piston 52 in the solenoid is unextended as shown in FIG. 2. Depressing the switch 64 actuates the solenoid and the piston 52 extends to the right. By releasing the switch 64 after it has been depressed, the switch 64 inherently returns to the extended position, which opens the circuit so that the solenoid 50 is deactivated and the piston rod 52 is retracted.

An operator can use the present invention in the vehicle by rotating the hand throttle 30 clockwise to an intermediate position which moves the plunger 45 to the right to an intermediate position corresponding to an intermediate engine speed. When the hand throttle is in the idle position, the sliding collar 60 is positioned adjacent to the stop collar 62. As the hand throttle is moved to the intermediate position, the stop collar 62 travels to the right along with the plunger 45 away from the sliding collar 60.

The operator can thereafter increase the speed of the engine beyond the intermediate speed by using the hand throttle 30, or can increase the engine speed to full throttle by actuating the switch 64 by depressing the switch 64 on the lever 66. The sliding collar 60 is initially moved to the right into engagement with the stop collar 62. After the sliding collar 60 engages the stop collar 62, further extension of the piston rod 45 results in the sliding collar 60 moving further to the right. The stop collar 62 and plunger 45 are pushed to the right by the sliding collar 60, thereby increasing the engine speed to full throttle. The piston rod 52 remains extended while the button is depressed and the switch 64 is actuated.

As the plunger 45 moves to the right when the switch 64 is actuated, the plate 47 is pivoted counterclockwise. The rod 44 is rotated counterclockwise by the plate 47.

The counterclockwise rotation of the rod 44 pivots the plate 41 counterclockwise, and the pivoting plate 41 draws the rod 38 to the right and further increases the tension in the spring 35 by extending the spring. The rod 38 slides freely within the tube 37 away from the stem 36 of the yoke 34. The hand throttle 30 thus remains in the intermediate position after the switch 64 is actuated and the maximum engine speed is attained.

While the switch 64 is activated, the pressure of the sliding collar 60 pressing against stop collar 62 urges the rod 44 to rotate counterclockwise, and counterbalances the force of extension spring 35 which resists counterclockwise rotation of the rod 44. The spring 35 urges the rod 44 to rotate clockwise.

When the operator releases the switch 64, the switch is deactivated, the electro-magnetic field in the solenoid 50 is turned off, and the spring element in the solenoid 50 causes the piston rod 52 to fully retract. The pressure of the sliding collar 60 against the stop collar 62 is thereby eliminated. The extension spring 35 then urges the rod 44 to rotate clockwise, and the plunger 45 is moved to the left. The engine speed is reduced as the plunger 45 moves to the left, and the stop collar 62 moves toward the sliding collar 60 to the left.

The clockwise rotation of the rod 44 also urges the rod 38 to slide freely within hollow tube 37 to the left towards stem 36 until the free end of rod 38 engages the stem 36. Since the hand throttle 30 is set and locked into a position corresponding to an intermediate engine speed, there is no tendency for the spring 35 to continue rotating the rod 44 clockwise once the rod 38 abuts the stem 36. When this occurs, the stop collar 62 will be spaced from the sliding collar 60.

The operator can further decrease the engine speed below the intermediate speed by rotating the hand throttle 30 counterclockwise. The tension in the spring 35 causes the rod 44 to rotate clockwise, which moves the rod 38 to the left to maintain the free end of the rod 38 in engagement with the stem 36. The clockwise rotation of the rod 44 also moves the plunger 45 to the left which pivots the fuel pump throttle lever 27 counterclockwise to decrease the engine speed. In this manner, the engine speed can be reduced to the idling speed.

In accordance with this invention, a backhoe operator can run the tractor's engine at either a predetermined intermediate speed or at full throttle while retaining full use of both hands and feet to operate the backhoe hydraulic control levers and/or pedals. The switch 64 is activated by using a finger or a hand that is holding one of the backhoe control levers.

The operator sets the preselected intermediate engine speed by using the backhoe hand throttle 30, and operates the backhoe at this setting when maximum engine speed is not needed. For example, backhoe operations that do not require maximum engine speed are filling the backhoe bucket and lifting loads with the backhoe. For operations that require maximum engine speed, such as lifting the bucket out of a deep trench or multiple function operations, full engine speed can be quickly and easily attained by activating the switch 64 which is provided on the backhoe control hand lever 66. The increase in engine speed is attained while the backhoe operator faces the backhoe, so that the operator does not have to take his eyes off of the backhoe.

It is also a feature that the efficiency of fuel consumption is increased because backhoe operations that can be performed at an intermediate engine speed are conveniently conducted at the preselected intermediate speed.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. In a backhoe on a vehicle having an engine and a frame, said backhoe having a tower pivoted about a fixed pivot axis by a hydraulic control system powered by said engine, the improvement comprising means for adjusting the speed of said engine to control the flow of fluid in said hydraulic control system, comprising:

axially extending plunger means having one end operatively connected to said engine, said plunger means being movable along its axis for controlling the speed of said engine, stop means positioned on said plunger means, lever means having one end operatively connected to the other end of said plunger means, and an opposite end engageable by the vehicle operator, said lever means being movable between a first position in which said plunger means is in a first position said engine speed is relatively slow, and a second position in which said plunger means is in a second position and said engine speed is relatively fast, and being positionable at intermediate positions therebetween, engagement means positioned adjacent to said plunger means and movable in the direction of the axis of said plunger means, said engagement means being adapted to abut said stop means and move said stop means and said plunger means along the axis of said plunger means, piston means supported by said vehicle frame and having one end operatively connected to said engagement means, said piston means being movable between a retracted position and an extended position, said piston means comprising an electric solenoid that is secured to said vehicle frame, said solenoid having a piston rod that is operatively connected to said engagement means and is movable between a retracted position and an extended position, means for activating said piston means to move said piston means from said retracted position to said extended position, and for deactivating said piston means, spring means having one end secured to said vehicle frame and an opposite end operatively connected to the other end of said plunger means, such that movement of said plunger means towards said second position increases the tension in said spring means, and the tension in said spring means causes said spring means to move said plunger means toward said first position when said piston means is deactivated, whereby an operator can move said lever means to an intermediate position between said first position and said second position which moves said plunger means to an intermediate position corresponding to an intermediate engine speed, and said operator can increase the speed of said engine to a speed greater than said intermediate speed by activating said piston means which moves said engagement means into engagement with said stop means and moves said plunger means towards said second position, whereupon said operator can decrease the speed of said engine to said intermediate speed by deactivating said piston means, and said operator can further decrease the speed of said engine by moving said lever means from said intermediate position towards said first position.

2. A backhoe as defined in claim 1 wherein said means for activating said piston means comprises an electric switch.

3. A backhoe as defined in claim 2 wherein said tractor includes a backhoe control lever, and said switch is positioned on said backhoe control lever.

4. A backhoe as defined in claim 1 wherein said vehicle has a cab, and said lever means is positioned in the front portion of the cab and is adapted to be used by the vehicle operator when facing the front of the vehicle, and said backhoe control lever is positioned in the rear portion of the cab and is adapted to be used by the vehicle operator when facing the rear of the vehicle.

5. A backhoe as defined in claim 1 wherein said stop means comprises a first collar secured to said plunger means, and said engagement means comprises a second collar that is slidably disposed over said plunger means.

6. A backhoe as defined in claim 1 wherein said piston means moves to said fully extended position when said actuation means is actuated, whereby said plunger means is moved to said second position which corresponds to a maximum engine speed.

7. A backhoe as defined in claim 1 wherein:

a rotatable rod is supported by said vehicle frame, said other end of said plunger means is operatively connected to said rod such that rotation of said rod moves said plunger means along the axis of said plunger means, said one end of said lever means is operatively connected to said rod such that movement of said lever means rotates said rod which is also connected to said plunger means, whereby said lever means is operatively connected to said plunger means.

8. A backhoe as defined in claim 7 wherein said opposite end of said spring means is operatively connected to said rod, whereby movement of said plunger means towards said second position rotates said rod in a first direction and increases the tension in said spring means, and deactivating said actuation means causes said spring means to rotate said rod in the opposite direction which moves said plunger means towards said intermediate position.

9. A backhoe as defined in claim 8 wherein said rod is a first rod, said lever means includes a second rod having one end grippable by the operator and an opposite end portion having a stop member spaced from the ends thereof, and further includes a third rod having one end operatively connected to said first rod and an opposite end portion, one of said end portions defining a tube with an open end, and the other of said end portions being slidably received in said tube, the opposite end portion of said third rod abutting said stop member when said lever means is in said first position, whereby movement of said lever means from said first position to said intermediate position causes said stop member to move said third rod, which rotates said first rod in said first direction and moves said plunger means to an intermediate position in which said stop means is spaced from said engagement means, and actuating said actuation means causes said engagement means to move towards said stop means until it engages said stop means and moves said plunger means towards said second position, which rotates said first rod further in said first direction and moves said third rod relative to said second rod such that said third rod is spaced from said stop member, whereupon the operator can deactivate said actuation means which causes said spring means to rotate said first rod in said opposite direction which moves said third rod relative to said second rod until said third rod abuts said stop member, and said plunger means is moved by said first rod to said intermediate position corresponding to an intermediate engine speed.

* * * * *